United States Patent [19]

Ishibashi et al.

[11] Patent Number: 5,172,786
[45] Date of Patent: Dec. 22, 1992

[54] V BELT TYPE AUTOMATIC TRANSMISSION SYSTEM

[75] Inventors: Tadakazu Ishibashi; Nozomu Kishira; Yoshiharu Isaka, all of Iwata, Japan

[73] Assignee: Yamaha Hatsudoki Kabushi Kaisha, Iwata, Japan

[21] Appl. No.: 815,843

[22] Filed: Dec. 30, 1991

Related U.S. Application Data

[63] Continuation of Ser. No. 487,653, Mar. 2, 1990, abandoned.

[51] Int. Cl.$^5$ .................... B62M 27/02; F02B 75/06
[52] U.S. Cl. .................... 180/190; 74/15.63; 74/15.8; 74/15.88; 123/73 A; 123/192.2; 180/297; 180/364; 180/366; 474/8; 474/12; 474/13; 474/25
[58] Field of Search ............... 180/190, 6.2, 219, 357, 180/364, 366, 373, 355, 356, 363, 374, 297; 123/73 A, 52 M, 192 B, 192 C; 474/8, 12, 13, 17, 25; 74/11, 13, 15, 15.2, 15.6, 15.63, 15.66, 15.8, 15.84, 15.85

[56] References Cited

U.S. PATENT DOCUMENTS

| | | | |
|---|---|---|---|
| 3,048,056 | 8/1962 | Wolfram | 474/12 |
| 3,747,721 | 7/1973 | Hoff | 474/13 |
| 4,023,635 | 5/1977 | Teal | 180/190 |
| 4,031,761 | 6/1977 | Fisher et al. | 74/15.63 |
| 4,414,934 | 11/1983 | Vogl et al. | 123/192 B |
| 4,592,311 | 6/1986 | Makino | 123/73 A |
| 4,606,310 | 8/1986 | Makino | 123/192 B |
| 4,633,964 | 1/1987 | Boyer et al. | 180/190 |
| 4,637,354 | 1/1987 | Tominaga et al. | 180/219 |
| 4,651,689 | 3/1987 | Feichtinger | 123/192 B |
| 4,848,503 | 7/1989 | Yasui et al. | 180/190 |

FOREIGN PATENT DOCUMENTS

| | | | |
|---|---|---|---|
| 289791 | 11/1989 | Japan | 180/190 |
| 8205048 | 7/1984 | Netherlands | 474/8 |

*Primary Examiner*—Mitchell J. Hill
*Attorney, Agent, or Firm*—Ernest A. Beutler

[57] ABSTRACT

Several embodiments of snowmobiles driven by an engine and variable belt transmission mechanism wherein the variable belt transmission has its input shaft journaled for rotation in the crankcase of the engine and driven from the engine crankshaft through a gear reduction so that the transmission loads are not carried by the crankshaft and wherein the crankshaft torsional vibrations are not transmitted to the transmission input shaft.

20 Claims, 3 Drawing Sheets

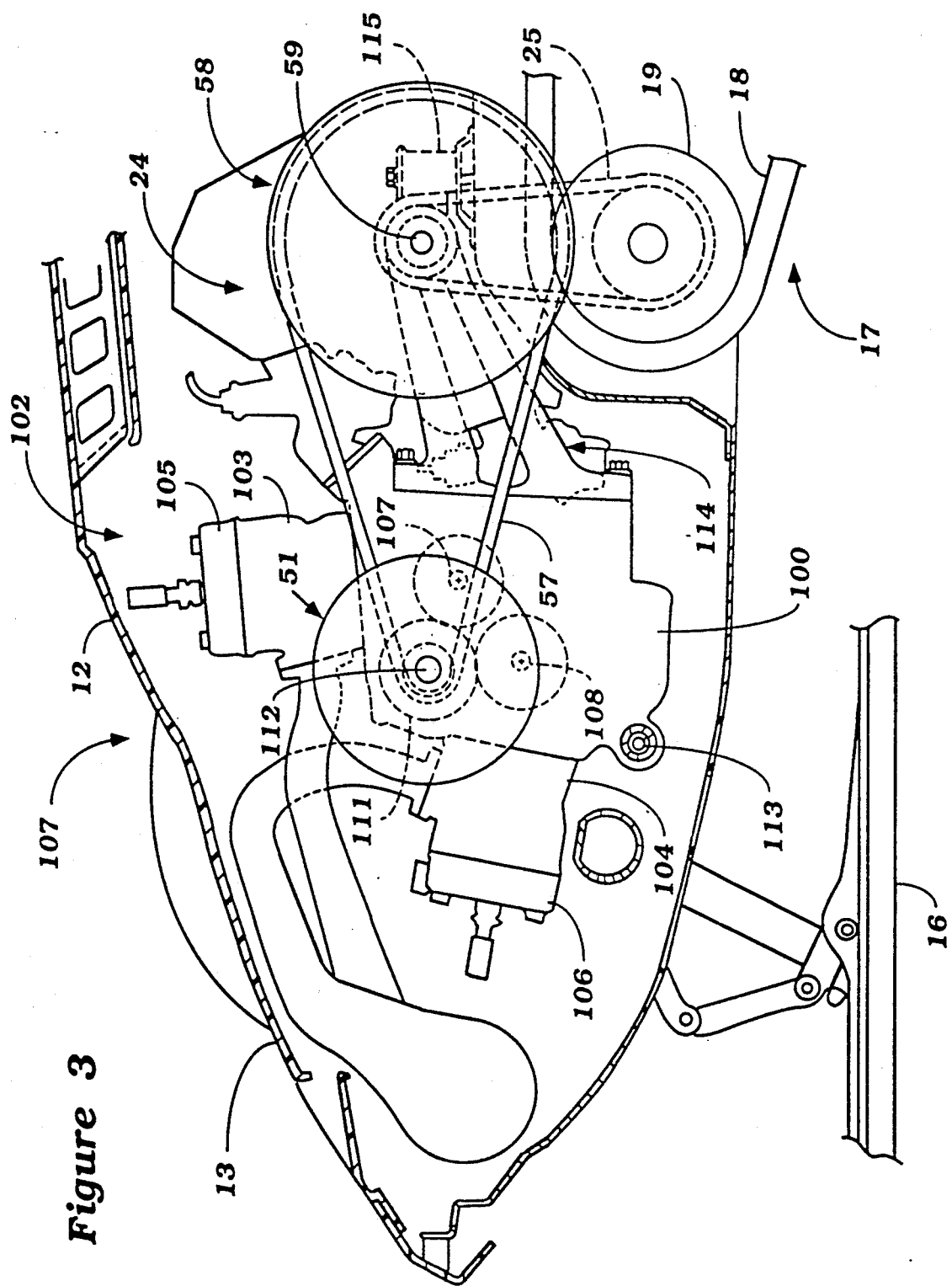

V BELT TYPE AUTOMATIC TRANSMISSION SYSTEM

This is a continuation of U.S. patent application Ser. No. 07/487,653 filed Mar. 2, 1990, now abandoned.

BACKGROUND OF THE INVENTION

This invention relates to a V belt type of automatic transmission system and more particularly to an improved combination engine and transmission.

The use of V belt type automatic transmissions are well known. Such transmissions employ driving and driven pulleys that are interconnected by means of a belt and wherein the effective diameter of one of the pulleys is changed, normally by a centrifugal type mechanism, so as to vary the transmission ratio between the shafts. Frequently, the driving pulley is affixed directly to the engine output shaft. Although this appears to have advantages, there are a number of disadvantages to such an arrangement. In the first instance, the load caused by the tension of the belt will put a torsional or bending load on the engine output shaft. Accordingly, the bearing construction for the engine must be stronger than when the engine drives a gear type transmission. As a result, the overall engine construction becomes larger and the engine must be specifically designed for use with the transmission.

In addition, because the transmission is coupled directly to the crankshaft, the transmission will receive the torsional and vibrational loads from the engine crankshaft caused by the pulsations in the transmission of power to it. As a result, the transmission itself must be made larger so as to accommodate the loads. Such direct drives of the transmission directly from the engine output shaft increase both the engine and transmission size.

Adding to the aforenoted defects, the speed at which a belt type transmission can be driven is somewhat restricted. This is due in part to the heat generated by such transmissions. Of course, it is well known that the efficiency of an engine can be improved and its power output can be increased if the engine is driven at a higher speed. Thus, when the transmission is directly coupled to the engine, its maximum rotational speed is limited by the transmission and, accordingly, the engine may not be as efficient as possible.

It is, therefore, a principal object of this invention to provide an improved engine transmission combination.

It is a further object of this invention to provide an arrangement wherein both the engine and transmission may be lighter than previous type arrangements employing belt type variable speed transmissions.

It is a further object of this invention to provide an improved internal combustion engine and belt type variable transmission combination.

Transmissions of the type aforedescribed are frequently used in powering vehicles such as snowmobiles . . . Because of the need for maintaining lightweight and high performance for snowmobiles, the aforenoted defects have resulted in snowmobiles that tend to be heavier than desired and also which may not have the desired performance.

It is, therefore, a still further object of this invention to provide an improved, lightweight and high performance snowmobile.

SUMMARY OF THE INVENTION

A first feature of this invention is adapted to be embodied in an engine transmission assembly that is comprised of an internal combustion engine having an output shaft rotatable about an axis. A transmission input shaft is journaled by the engine and driven by the engine output shaft. A variable driving pulley is associated for rotation with the transmission input shaft. A transmission output shaft is journaled for rotation about an axis parallel to the axis of the transmission input shaft and a variable driven pulley is associated with the transmission output shaft. A belt drives the driven pulley from the driving pulley.

Another feature of the invention is adapted to be embodied in a snowmobile having a driving belt that is driven from the transmission output shaft of an engine transmission assembly as set forth in the preceding paragraph.

BRIEF DESCRIPTION OF THE DRAWINGS

FIG. 3 is a partial side elevational view of a snowmobile driven by an engine transmission assembly constructed in accordance with another embodiment of the invention.

DETAILED DESCRIPTION OF THE PREFERRED EMBODIMENTS OF THE INVENTION

Figure 1:
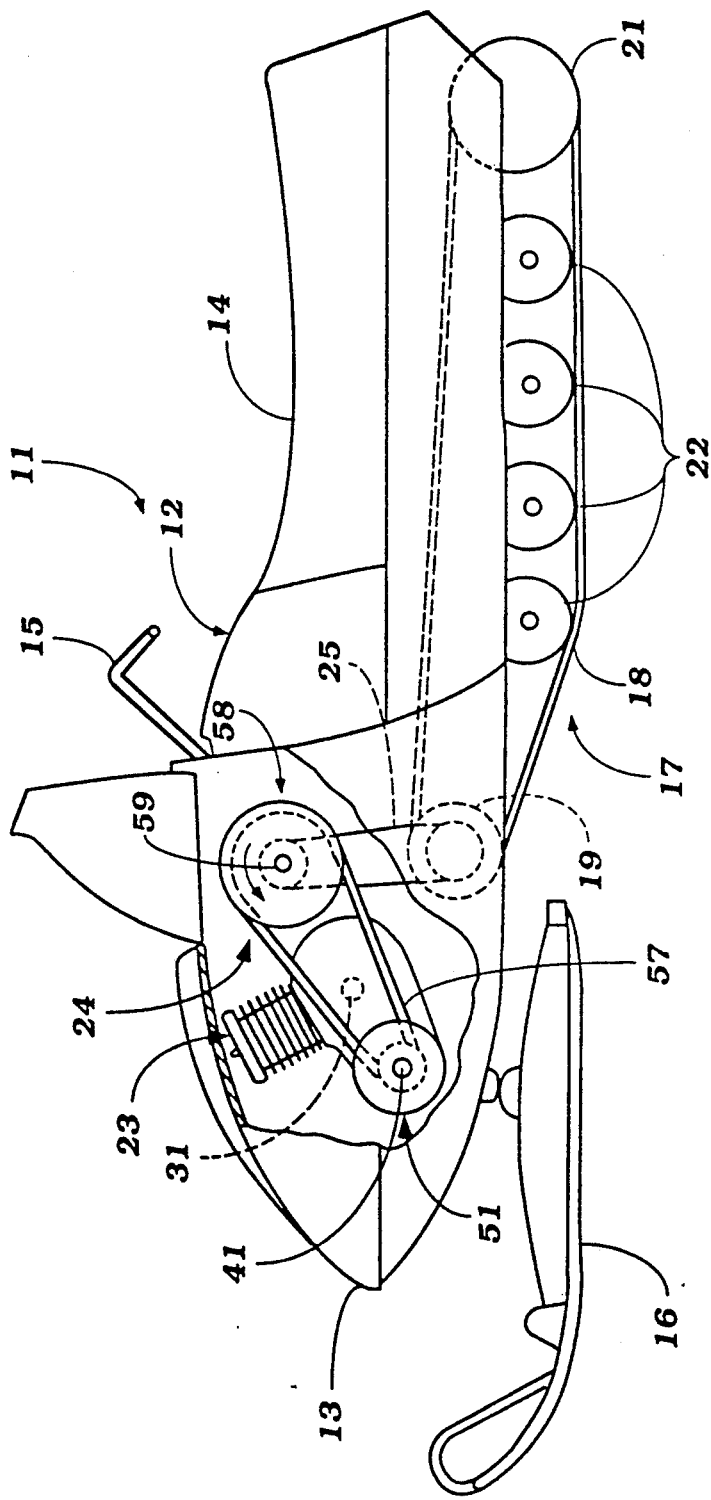
FIG. 1 is a side elevational view of a snowmobile driven by an engine transmission assembly constructed in accordance with an embodiment of the invention, with a portion broken away.

Referring first to FIG. 1, a snowmobile constructed in accordance with an embodiment of the invention is identified generally by the reference numeral 11. The snowmobile 11 includes a body assembly, indicated generally by the reference numeral 12, that includes a front portion 13 and a rearwardly positioned seat 14 designed to accommodate one or more riders seated in straddle fashion thereupon. A steering handlebar assembly 15 is provided forwardly of the seat 14 so that the operator may steer a pair of front skis 16 in a known manner. A drive belt, indicated generally by the reference numeral 17, is positioned beneath the seat 14 for driving the snowmobile 11 in a known manner. The driving belt 17 includes a belt 18 that is trained over a driving pulley 19, an idler pulley 21 and a plurality of support pulleys 22.

The driving belt assembly 17 is driven by means of an engine transmission assembly constructed in accordance with an embodiment of the invention and which includes an internal combustion engine 23 and a variable speed belt transmission 24. The belt transmission 24 drives the driving pulley 19 of the belt assembly 17 through a further belt 25. The engine transmission assembly 23 and 24 is positioned in an engine compartment contained within the front portion 13 of the body.

Figure 2:
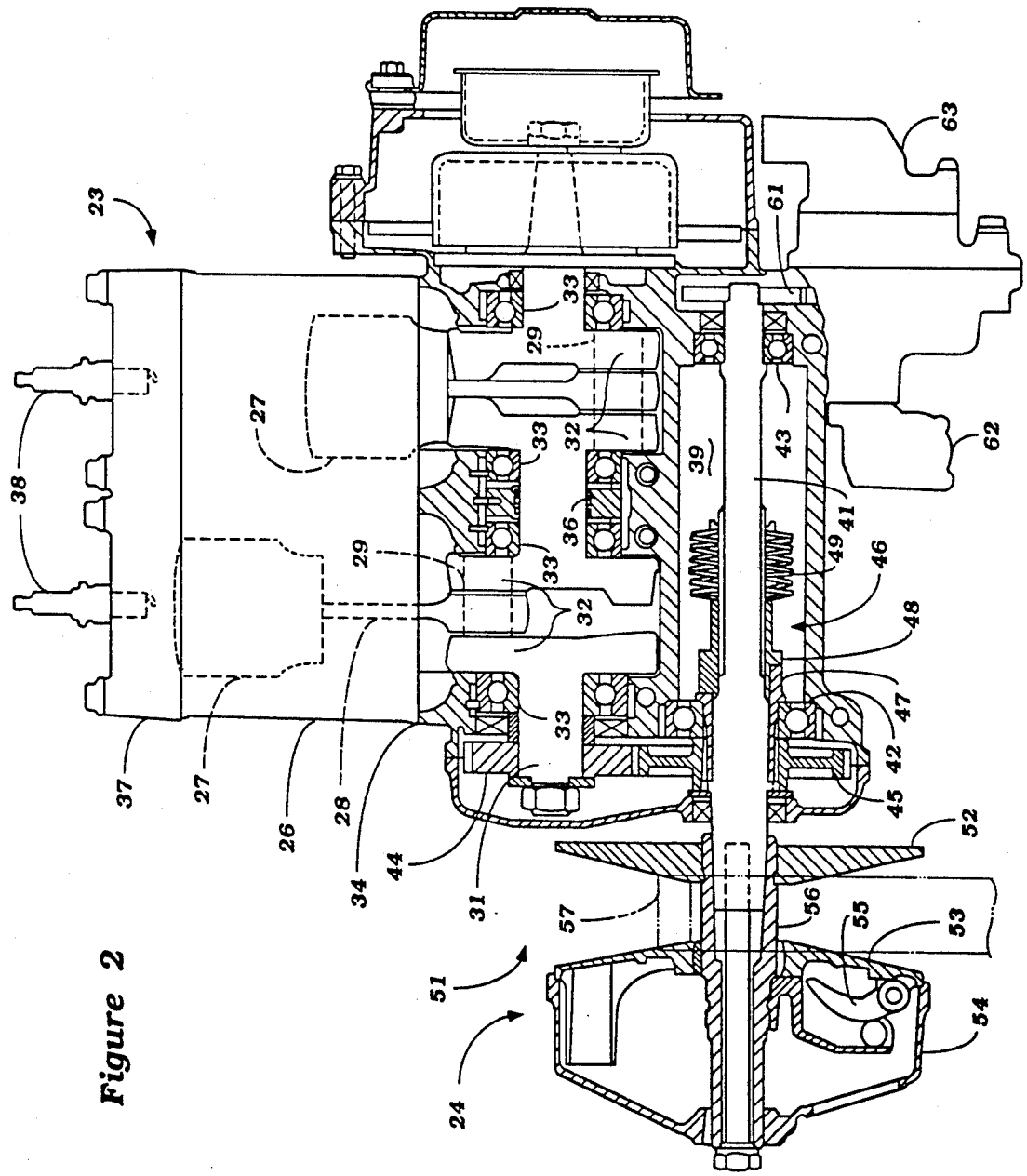
FIG. 2 is a side elevational view of the engine and transmission with a portion broken away and shown in section.

Referring now in detail primarily to FIG. 2, in this embodiment of the invention, the engine 23 is depicted as being of the two cylinder in line type that operates on a two stroke crankcase compression principal. To this end, the engine 23 is provided with a cylinder block 26 in which cylinder bores (not shown) are formed. Pistons 27 reciprocate in the cylinder bores and are connected by means of connecting rods 28 to the throws 29 of an engine output shafts or crankshaft, indicated generally by the reference numeral 31. The throws 29 are defined by pairs of adjacent cheeks 32. The term "cheeks" as used hereinafter, and in the appended claims, refers specifically to the facing surfaces of a throw of a crankshaft. A throw is defined as the distance from the centerline of the main journal to the centerline of the connecting rod journal (See Schwaller, *Motor Automobile Mechanics*, Delmar Publishers Inc., New York, 1988, at page 142). The facing surfaces of the cheeks constitute the portion of the crankshaft that holds the connecting rod.

The crankshaft 31 is supported for rotation about an axis that extends transverse to the snowmobile body 12 by means including a plurality of spaced main bearings 33 that cooperate with bearing portions of the crankshaft 31. The bearings 33 are supported by a crankcase casting 34 that is affixed to the cylinder block 26 in a suitable manner. Thus, the internal combustion engine 23, as shown in FIG. 2, has an output shaft 31 which is located within the crankcase casting 34.

As is conventional with two cycle crankcase compression engines, a labyrinth type seal 36 seals individual crankcase chambers of the crankcase portion of the assembly from each other and a fuel/air charge is admitted to this crankcase chamber from a suitable charge former (not shown).

The charge admitted to the crankcase chambers is transferred to the combustion chamber defined by the heads of the pistons 27, the cylinder bores and a cylinder head assembly 37 that is affixed to the cylinder block 26 in a known manner through scavenge passages. This charge is then fired by spark plugs 38 and exhausted through exhaust ports (not shown) and a suitable exhaust system.

From the foregoing, it should be readily apparent that the engine 23 is made up of a plurality of castings including the cylinder block 26 and crankcase casting 34.

Since the invention relates primarily to the manner in with the transmission 24 and engine 23 are related rather than specific details of the construction of the engine 23 per se, further description of the engine portion of this combination is not believed to be necessary. Any details that are not illustrated or which have not been described may be considered to be conventional for the purposes of this disclosure.

Referring still primarily to FIG. 2, it should be noted that the crankcase assembly 34 is extended beyond the crankcase chambers in which the cheeks 32 of the crankshaft 31 rotate. This area defines a transmission primary shaft casing 39 in which a transmission primary or input shaft 41 is rotatably journaled by means of a pair of spaced apart bearings 42 and 43. The bearings 42 and 43 are supported directly within the casting of the crankcase 34 and hence will be provided with a very rigid construction. Also, since the input shaft 41 is supported independently of the crankshaft 31, the crankshaft 31 and its bearing assembly can be designed so as to take only the loading applied to it by the engine. This results, as aforenoted, in a lighter weight construction.

The transmission input shaft 41 is driven from the crankshaft 31 by means of a pair of intermeshing gears including a gear 44 that is fixed appropriately for rotation with the crankshaft 31 and which meshes with a gear 45 that is journaled on the input shaft 41. The gear 45 is coupled for rotation with the input shaft 41 by means of an overload release mechanism, indicated generally by the reference numeral 46. This mechanism includes an input cam 47 that is affixed for rotation with the driven gear 45 and which is journaled on the input shaft 41. The input cam 47 has teeth or a lug that is received in a corresponding recess in a driven member 48 which is splined for rotation with the shaft 41. These teeth or interlocking members are urged into engagement by a bellville spring assembly 49. As a result, the input shaft 41 will normally be driven with the engine crankshaft 31. However, if the driving belt 18 encounters a substantial load, the driven cam 48 may move axially away from the driving cam 47 so as to permit the crankshaft 31 to rotate without driving the shaft 41. Once the usual load is removed, the driving relationship will be reestablished.

The transmission mechanism 24 further includes a variable driving pulley, indicated generally by the reference numeral 51 that is comprised of a fixed pulley sheave half 52 that is fixed for rotation with the primary shaft 41 and a moveable pulley sheave half 53 that is operated by a centrifugal governor mechanism contained within a casing 54 and including a plurality of pivotally supported levers 55. A hub 56 of the pulley assembly 51 interconnects the drum 54 with the shaft 41 and as the speed of rotation of the shaft 41 increases, the centrifugal mechanism will cause the effective diameter of the pulley 51 to increase so as to reduce the speed reduction between the transmission input shaft 41 and the output shaft to be described. coil compression springs may be contained within the casing 54 and, of course, any form of centrifugal device may be utilized for changing the diameter of the pulley 51.

A belt 57 is trained around the pulley defined by the sheave halves 52 and 53 and, in turn, drives a second variable pulley mechanism, indicated generally by the reference numeral 58 and which is associated with an intermediate or output shaft 59 that is journaled on the body 12 of the snowmobile 11 in a suitable manner. The pulley 58, as is typical in this art, is a spring biased device and as the effective diameter of the pulley 51 increases, the effective diameter of the pulley 58 will decrease so as to provide a drive ratio that goes from a low ratio at low speeds to a higher ratio at higher speeds, as is well known in this art. A further pulley is affixed for rotation with the output shaft 59 and drives the belt 25, which, in turn, drives the snowmobile drive belt assembly 17 as aforenoted.

In addition to the indirect drive of the transmission primary shaft 41 from the crankshaft 31, certain of the engine accessories may also be driven directly from the shaft 41. In the illustrated embodiment, there is provided a further gear 61 at the end of the primary shaft 41 opposite to the variable pulley 51. This gear can drive such accessories as an oil pump 62 and water pump 63.

The embodiment of the invention as thus far described has dealt with an engine of the type having in line cylinders. Of course, the invention can be also utilized in conjunction with engines wherein the cylinders or cylinder banks are disposed at an angle to each other such a V type engine. FIG. 3 shows the application of the invention to such an embodiment. In this embodiment, the engine is of the general configuration as set forth in U.S. Pat. No. 4,592,311, entitled "Intake System For Two Cycle Multi-Cylinder Engines", issued Jun. 3, 1986 and U.S. Pat. No. 4,606,310, entitled "Crankcase For Multi-Cylinder Engines", issued Aug. 19, 1986, both of which applications are assigned to the Assignee hereof.

Referring specifically to this embodiment, a snowmobile constructed in accordance with this embodiment is identified generally by the reference numeral 101 and has a general overall construction the same as that of the previously described embodiment. For that reason, components of this embodiment which are the same as that previously described have been identified by the same reference numerals and will not be described again, except insofar as is necessary to understand the construction of this embodiment.

In this embodiment, an internal combustion engine, indicated generally by the reference numeral 102 is provided with a pair of angularly disposed cylinder banks 103 and 104 each of which is provided with one or more cylinder bores. Since the internal construction of the engine, as aforenoted, except for the operation of the crankshaft and its interrelationship with the transmission primary shaft forms no part of the invention, any conventional construction may be employed.

Cylinder heads 105 and 106 are affixed to each of the cylinder banks 103 and 104 respectively. Each cylinder block has its respective crankshaft 107 and 108 journaled for rotation within a crankcase assembly 109 to which the cylinder blocks 103 and 104 are affixed in a known manner. The crankshafts 107 and 108 have respective gears affixed to them that drive an input gear 111 of a transmission primary shaft 112 that is journaled for rotation in the crankcase assembly 109 in a manner as previously described. This primary shaft 102 is associated with a variable pulley 51 of the type previously described which drives a belt 57, which in turn, drives the variable pulley 58 and final drive of the type aforedescribed.

In this embodiment, it should be noted that the engine 102 is mounted on a pair of elastic joints 113 that are affixed to the body 12 in a known manner. In addition, a support bracket 114 is affixed to the crankcase assembly 109 and is supported by an elastic joint 115 that is affixed to the body 12. In all other regards, this embodiment is the same as that previously described. For that reason, further description is not believed to be required.

It should be readily apparent from the foregoing description that the described embodiments of the invention are particularly adapted to provide a good engine variable speed pulley transmission in which each component of the pair can be relatively light in weight and designed for its own purposes. Although two embodiments of the invention have been illustrated an described, various changes and modifications may be made without departing from the spirit and scope of the invention, as defined by the appended claims.

We claim:

1. An engine and transmission assembly comprising: an internal combustion engine; said engine including a crankcase; and an engine output shaft journaled within said crankcase and rotatable about an axis; and a transmission input shaft journaled within said crankcase; wherein said engine output shaft and said transmission input shaft are separate members, spaced apart from one another within said crankcase; and further comprising means for driving said transmission input shaft from said engine output shaft, a driving variable pulley on said transmission input shaft, a transmission output shaft journaled for rotation about an axis parallel to the axis of rotation of said transmission input shaft, a variable driven pulley on said transmission output shaft, and belt means for driving said variable driven pulley from said variable driving pulley.

2. An engine and transmission assembly as set forth in claim 1 wherein the engine is comprised of a plurality of main castings and wherein the transmission input shaft is journaled by one of said main castings.

3. An engine and transmission assembly as set forth in claim 1 wherein the transmission input shaft is journaled in a crankcase of the engine.

4. An engine and transmission assembly as set forth in claim 1 wherein the transmission input shaft is driven from the engine output shaft through a reduction gear train, said reduction gear train mechanically linking said transmission input shaft with said engine output shaft so that the transmission input shaft rotates at a slower speed than the engine output shaft.

5. An engine and transmission assembly as set forth in claim 4 further comprising an overload release mechanism in the means for driving the transmission input shaft from the engine output shaft.

6. An engine and transmission assembly as set forth in claim 4 further including engine accessories driven by the transmission input shaft.

7. An engine and transmission assembly as set forth in claim 4 wherein the transmission input shaft is journaled in a crankcase of the engine.

8. An engine and transmission assembly as set forth in claim 7 further comprising first and second sides of the engine output shaft, wherein said first side is located in an opposing fashion to said second side with respect to the engine output shaft, and wherein the transmission input shaft is positioned in a region to said first side of said engine output shaft and the transmission output shaft is disposed in a region to said second side of the engine output shaft.

9. An engine and transmission assembly as set forth in claim 8 wherein the engine has angularly inclined cylinder banks.

10. An engine and transmission assembly as set forth in claim 9 further comprising a crankshaft located within each cylinder bank, wherein each crankshaft has a respective output shaft located to one end thereof, and wherein each crankshaft is driven from within each respective cylinder bank, and wherein the output shafts are each coupled by a transmission to the transmission input shaft for synchronizing the crankshafts.

11. A snowmobile, having an engine and transmission assembly comprising an internal combustion engine; said engine including a crankcase; and an engine output shaft journaled within said crankcase and rotatable about an axis; and a transmission input shaft journaled within said crankcase; wherein said engine output shaft and said transmission input shaft are separate members, spaced apart from one another within said crankcase; and further comprising means for driving said transmission input shaft from said engine output shaft, a driving variable pulley on said transmission input shaft, a transmission output shaft journaled for rotation about an axis parallel to the axis of rotation of said transmission input shaft, a variable driven pulley on said transmission output shaft, and belt means for driving said variable driven pulley from said variable driving pulley; and further having a drive belt and wherein the drive belt is driven from the transmission output shaft.

12. A snowmobile as set forth in claim 11 wherein the engine is comprised of a plurality of main castings and wherein the transmission input shaft is journaled within one of said main castings.

13. A snowmobile as set forth in claim 11 wherein the transmission input shaft is journaled in a crankcase of the engine.

14. A snowmobile as set forth in claim 11 wherein the means for driving the transmission input shaft from the engine output shaft includes a reduction gear train so that the transmission input shaft rotates at a slower speed than the engine output shaft.

15. A snowmobile as set forth in claim 14 further comprising an overload release mechanism in the means for driving the transmission input shaft from the engine output shaft.

16. A snowmobile as set forth in claim 14 further including engine accessories, wherein said engine accessories includes an oil pump, a water pump, and the like, driven by the transmission input shaft.

17. A snowmobile as set forth in claim 14 wherein the transmission input shaft is journaled in a crankcase of the engine.

18. A snowmobile as set forth in claim 17 wherein the transmission input shaft and transmission output shaft are disposed on opposite sides of the engine output shaft.

19. A snowmobile as set forth in claim 18 wherein the engine has angularly inclined cylinder banks.

20. A snowmobile as set forth in claim 19 further comprising a crankshaft located within each cylinder bank, wherein each crankshaft has a respective output shaft located to one end thereof, and wherein each crankshaft is driven from within each respective cylinder bank, and wherein the output shafts are each coupled by a transmission to the transmission input shaft for synchronizing the crankshafts.

* * * * *